Patented Oct. 23, 1951

2,572,026

UNITED STATES PATENT OFFICE 2,572,026

SEPARATION OF ALPHA-CASEIN FROM WHOLE CASEIN

Norbert J. Hipp, Wyndmoor, Merton L. Groves, Philadelphia, and Thomas L. McMeekin, Glenside, Pa., assignors to the United States of America, as represented by the Secretary of Agriculture No Drawing. Application April 12, 1949, Serial No. 87,124

3 Claims. (Cl. 260—120)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

Alpha-casein is a protein constituent of whole casein present to the extent of about 75%, the other constituents, beta-casein and gamma-casein, being present to the extent of about 20% and 5%, respectively.

The present invention relates to the separation of alpha-casein from whole casein, and has among its objects production of the alpha-casein in high yield and pure state, and by a simple and economical procedure.

In general, according to the invention, whole casein, such as that freshly precipitated from skim milk or the dried product, is dissolved in an aqueous alkaline medium in a usual manner, such as by use of ammonium hydroxide, alkali metal hydroxides, and so forth, in sufficient concentration to give a resulting pH of the casein solution of about 8. About 0.5 to 15% of whole casein in the solution is satisfactory. A substantially neutral, soluble inorganic salt and a water-miscible solvent, particularly a lower alkanol in sufficient quantity to give an alkanol concentration of from about 25 to 75% by volume, are then mixed with the solution, following which the mixture is adjusted to a pH of 6 to 7, 6.1 to 6.9 being preferred. This results in precipitation of the alpha-casein without precipitation of the other casein constituents and the alpha-casein is readily separated as by filtration or centrifugation.

Many neutral, inorganic salts are suitable for the purpose, including sodium chloride, ammonium acetate, sodium phosphate, and so forth. The amounts may be varied to give a molar concentration of the salt in the solution of about .05 to .20. The pH may be adjusted with any of the usual acids or acidic substances, such as acetic, hydrochloric, sulfuric, or oxalic acid.

The process is operable at ordinary room temperatures.

The following example exhibits the invention in greater detail.

Example

One hundred grams of casein was dissolved in 2-3 g. of ammonium hydroxide diluted to 2500 cc. and the solution clarified by means of a Sharples centrifuge. One mole (77 g.) of ammonium acetate was added to the solution, following which 2500 cc. of absolute ethanol was added. Alpha-casein was then precipitated by adding acetic acid in 50% aqueous ethanol until the solution had a pH of about 6.5. The alpha-casein precipitate was removed by filtration. The product so obtained consisted essentially of alpha-casein free from any appreciable amount of extraneous materials.

Pure alpha-casein was obtained by dissolving the recovered precipitate in dilute ammonium hydroxide at a pH of about 7.5, diluting with water to 1000 cc., adding 1000 cc. of absolute ethanol and precipitating the alpha-casein by gradually adding a solution of ammonium acetate in 50% aqueous ethanol, until precipitation of alpha-casein took place. This usually occurred on addition of approximately 100 cc. of molar ammonium acetate solution. The alpha-casein was filtered off, and dried. The yield was approximately 20 g. This may be substantially increased by reworking the recovered impure casein by a similar procedure.

Similar results were also obtained by corresponding procedures using in place of ethanol other water-miscible lower alkanols like methanol and isopropanol.

Sodium, or potassium hydroxide, may be used in lieu of ammonium hydroxide in making the casein solution, and ammonium acetate, as the inorganic salt, may be replaced by sodium chloride, sodium phosphate or other neutral salts.

We claim:

1. A process of separating alpha-casein from whole casein comprising dissolving whole casein in an aqueous alkaline medium, mixing a substantially neutral, soluble inorganic salt and a lower alkanol therewith, adjusting the pH of the mixture to 6 to 7 to precipitate the alpha-casein, and separating the precipitated casein from the mixture.

2. The process of claim 1 wherein the amount of salt is such as to give a molar concentration of salt in the solution of about .05 to .20, and the amount of alkanol is such as to give an alkanol concentration of from about 25 to 75% by volume.

3. A process of separating alpha-casein from whole casein comprising dissolving whole casein in an aqueous alkaline medium at a pH of about 8, at room temperature, and in an amount to give a solution having a whole casein concentration of from 0.5 to 15%, mixing a substantially neutral, soluble inorganic salt and a lower alkanol therewith in an amount to give a concentration of salt in the solution of about .05 to .20 and an alkanol concentration of from 25 to 75% by volume, adjusting the pH of the mixture to 6 to 7 to precipitate the alpha-casein, and separating the precipitated casein from the mixture.

NORBERT J. HIPP.
MERTON L. GROVES.
THOMAS L. McMEEKIN.

REFERENCES CITED

The following references are of record in the file of this patent:

UNITED STATES PATENTS

| Number | Name | Date |
|---|---|---|
| 2,390,074 | Cohn | Dec. 4, 1945 |

FOREIGN PATENTS

| Number | Country | Date |
|---|---|---|
| 544,182 | France | June 15, 1922 |

OTHER REFERENCES

Sutermeister, "Casein and Its Industrial Applications," Reinhold, New York, 2nd ed. 1939, pp. 67-68.